United States Patent Office 3,116,976
Patented Jan. 7, 1964

3,116,976
PROCESS FOR RECOVERING BROMINE
Frederick John Gradishar and Rowland Frank Hein, both of Wilmington, Del., assignors to E. I. du Pont de Nemours and Company, Wilmington, Del., a corporation of Delaware
No Drawing. Filed Aug. 10, 1961, Ser. No. 130,485
6 Claims. (Cl. 23—216)

The present invention relates to a process for recovering bromine adsorbed on anion-exchange resins. More particularly, this invention is directed to the removal of the adsorbed bromine by treatment with chlorine. Another embodiment of the present invention is a process for the recovery of bromine from sea water and other bromide-containing brines wherein the bromide content thereof is converted to bromine, followed by adsorbing the bromine as polybromohalide anions on an anion-exchange resin, and then removing the bromine from the resin, as a solution significantly more concentrated than the original brine, by treatment with chlorine according to the novel process of the present invention as hereinafter described and claimed.

As disclosed by Aveston et al., Chemistry and Industry, September 1957, molecular bromine may be adsorbed as polyhalide ions on strong base anion-exchange resins and then recovered therefrom by treatment involving either (a) reducing the bromine to bromide with sodium bisulfite, or (b) extraction with organic solvents such as alcohol or acetone, or (c) reaction with bromine-reactive substances such as styrene and aniline in alcohol. None of these suggested prior art methods is entirely satisfactory. Reduction of bromine yields bromide, which, if bromine itself is desired, must be re-oxidized (as by treatment with chlorine according to known technology). Use of organic solvents and of organic reagents for bromine is obviously limited, particularly as to cost.

It is, therefore, an object of this invention to provide a novel method of removing bromine adsorbed on anion-exchange resins. Another object is to avoid the use of costly organic solvents and reactants for bromine and to eliminate the use of reducing agent in the recovery of bromine from the resin. Still another object of this invention is to elute the bromine from the resin in a form directly capable of yielding free molecular bromine.

These and other objects will become apparent in the following description and claims.

More specifically, the present invention is directed to a process for recovering bromine that is absorbed on an anion-exchange resin, which process comprises contacting the bromine-laden resin with chlorine and recovering bromine from the effluent.

It is believed that, in this process, chlorine oxidizes bromine on the resin to bromic acid which enters the aqueous phase which normally surrounds the resin. The reaction is reversible; thus, the bromic acid solution is a potential and ready source of molecular bromine. The removal of the bromine from the resin is preferably accomplished by contacting the bromine-laden resin with aqueous oxidant chlorine, in amounts and under conditions of pH, time, temperature, and mixing sufficient to obtain the bromine as aqueous bromic acid, the aqueous bromic acid then being handled according to known methods to provide free molecular bromine.

Anion-exchange resins are characterized by having fixed cationic sites and removable (exchangeable) anionic sites. In general, the larger the anion, the more strongly it is held (chemisorbed) by the cationic sites, and thus the larger anions tend to displace the smaller anions. When such resin in the chloride or bromide form is contacted with bromine or with bromine and chlorine (i.e. BrCl), the halogen is chemisorbed, apparently as polybromohalide anions of the formula, $Br_nX_m^-$, where X is Br or Cl and $n$ and $m$ are small whole numbers whose sum is odd e.g. $Br_3^-$, $Br_2Cl^-$, $BrCl_2^-$, and the like, depending on the amounts of bromine and chlorine present. These polyatomic halide ions are rather large compared to the corresponding monatomic halide ions and are strongly held by the resin.

In practicing the present invention, the bromine of the complex polyhalide ions is converted to bromic acid, the anion of which, $BrO_3^-$, is also rather large and should be strongly held by the resin. However, under the specified conditions of this process, bromic acid or its equivalent in the form of bromine is obtained in the water phase in substantial amounts. The overall process can be represented by the following equilibrium, $Br_2+5Cl_2+6H_2O=2HBrO_3+10HCl$, the forward reaction representing the oxidation of bromine to bromic acid which is eluted from the resin, and the reverse reaction representing the stripping of the bromine from bromic acid solution, as by distillation. The volatilized bromine can be separated from chlorine that may codistill by known methods. The residual hypochlorous acid (chlorine water) solution can be reused to treat another batch of bromine-laden resin according to the present invention.

Other reactions of chlorine and bromine pertinent to the present novel process are:

(1) $\qquad Cl_2+2Br^-=Br_2+2Cl^-$ (2) $\qquad Br_2+Cl_2=2BrCl$ (3) $\qquad 2Cl_2+BrCl+3H_2O=HBrO_3+5HCl$ Thus, by the action of chlorine, bromide on the resin may be converted in turn to bromine (1), bromine chloride (2) and bromic acid (3). The bromine may be removed from the resin in the form of bromic acid or it may be removed directly, that is, displaced from the resin by chlorine and obtained for example as bromine-chloride. In any case an excess of chlorine is used. From Equation 3, the ratio of chlorine to bromine (taken as BrCl) should be at least 2 to 1. Normally this ratio will be at least 6 to 1, most particularly between about 25 to 100 to 1. Larger ratios are generally unnecessary. The amount of chlorine used normally depends on the temperature and time of contact, and on the size and porosity of the resin granules. (Such factors influence the ease with which chlorine can diffuse into the interior of the resin granules.) Excess chlorine over the stoichiometric 2 to 1 permits use of relatively low operating temperatures and short reaction times. With the preferred amounts of chlorine, good results are obtained at from room temperature to 100° C. in 5 to 20 minutes. Reaction time however may be shorter (1 to 2 minutes) or longer (3 to 4 hours) depending on the temperature, amount of chlorine used and the nature of the resin.

The chlorine oxidant may be molecular chlorine or hypochlorous acid or its water-soluble salts, in amounts corresponding to the specified quantities of $Cl_2$.

The amount of water present should be enough to wet the resin, act as carrier for the chlorine oxidant, facilitate mixing of the chlorine with resin, and to carry away products of the chlorine-bromine reaction e.g. $HBrO_3$ and HCl. Preferably, using a bed of resin granules, the water phase should saturate the resin, occupy the voids between granules and give a free-board above the bed of at least about 10 to 100% of the bed depth. Larger amounts may be used, as this is not critical, even 100 times the volume of the resin being practical. The aqueous phase is preferably a brine, e.g. sea water, dilute or concentrated NaCl and normally at least an equal volume based on the resin used.

The bromine-laden resin can be brought into intimate contact with the oxidant chlorine, batchwise or continuously. For example, the reactants may be mixed in any order and agitated in a kettle, or fed as separate streams into a pipeline reactor and mixed under conditions of turbulent flow, the aqueous phase being separated from the resin phase after the desired degree of reaction has occurred. Also, the present novel process is adaptable to column operation wherein the resin is in the form of a fixed or fluid bed. In this case, the chlorine oxidant, as a saturated solution in sea water may be allowed to percolate down through (and may be recirculated through) a bed of the bromine-rich resin granules; or, the resin granules, supported as a column in contact with the water phase, may be treated with a stream of $Cl_2$ gas introduced at the bottom and passed up through the column, the force of the stream being used to effect mixing of the reactants, even to fluidize the resin-water mixture if desired.

The water phase is separated from the resin by settling, decanting, screening, filtering, or centrifuging, according to known principles and methods. To recover the bromine content from the thus recovered water phase, the solution at pH below 5, preferably to less than 3, is maintained under conditions of temperature and pressure required to effect distillation of bromine therefrom. The desired acidity can be obtained, if necessary, by the addition of a strong acid, such as hydrochloric, sulfuric, or phosphoric acids.

The source of the bromine and the particular method of adsorbing it on the resin is immaterial to the present process. However, an important embodiment of this invention is the recovery of bromine from bromide-containing brines, most importantly sea water. The brine is acidified and oxidized to convert its bromide content to bromine. For example, sea water containing about 65 p.p.m. bromine is acidified with hydrochloric or sulfuric acids or mixtures thereof, preferably to a pH between 3 and 5, and then chlorinated with at least about 0.5 mole $Cl_2$ per bromide ion, preferably about 1 mole $Cl_2$ per $Br^-$. The thus acidified and chlorinated sea water is then contacted with a strong base anion-exchange resin as described herein, whereby bromine is adsorbed by the resin. The bromine-laden resin is then separated from the spent sea water, and treated, according to the process of the present invention, to recover the bromine.

Suitable and available strong base anion-exchange resins are of the quaternary ammonium type. They are essentially long chain-like and web-like water insoluble molecules characterized by having quaternary ammonium groups as the fixed, i.e., non-exchangeable cationic sites. Associated with these sites are anions (which make the resin electrically neutral and which are the exchangeable constituents) that may be varied as desired by proper treatment as is well known in the art.

Typical resins are based on the polystyrene backbone; divinylbenzene cross-linking units provide the necessary degree of dimensional stability and water-insolubility to the polymer, while groups of the formula, —alkylene—$^+NR_1R_2R_3$ provide the positively charged sites. $R_1$, $R_2$, and $R_3$ are usually alkyl such as methyl, ethyl and the like, but may be alkylol such as hydroxyethyl, and may be joined to constitute along with the nitrogen atom a heterocyclic radical such as methylpiperidinium or pyridinium. Resins such as these may be prepared by chloromethylating a polystyrene-divinylbenzene copolymer, then reacting with the appropriate tertiary amine.

Specific resins that may be employed in the practice of the present invention are described in U.S. Patent 2,591,573. Other quaternary ammonium type resins that may be employed are disclosed in U.S. Patents 2,630,427 and 2,597,494 and in U.S. Patent 2,597,440. A specific representative example is the strong base anion-exchange resin prepared according to the Examples (A–B–C) of U.S. Patent 2,591,573. The hydroxide form of this resin is converted to the chloride form, for example, by flowing sea water through it. Also, it is understood that commercially available Amberlite IRA 400 listed in the following table is of the class of strong base anion-exchange resins described in U.S. Patent 2,591,573. In the present process, satisfactory results are obtained with the resins of the patent and with the commercial articles Amberlite IRA 400. The resins described in U.S. Patent 2,900,352 can also be used; for example, the resin prepared according to Example 5 of this patent. Also the resins described broadly and as specifically shown in Example 2 of U.S. Patent 2,614,099 may be utilized.

Many suitable resins are available commercially and include the following wherein the type I resins are understood to have —$C_6H_4CH_2$—$N(CH_3)_3$ groups, the type II resins contain

—$C_6H_4$—$CH_2$—$N(CH_3)_2CH_2CH_2OH$ groups, and the pyridine type to be based on pyridine as the source of the cationic sites:

STRONG BASE ANION-EXCHANGE RESINS

| Commercial Name | Source | Quaternary Ammonium Type |
|---|---|---|
| Duolite A-101 | Chemical Process Co. of Redwood City, California. | I. |
| Duolite A-101 D | | I. |
| Retardion 11A8 | | I. |
| Dowex 2 | Dow Chemical Co. of Midland, Michigan. | II. |
| Dowex 21K | | I. |
| Dowex 1 | | I. |
| Dowex 11 | | I. |
| Amberlite IRA 400 | Rohm and Haas Co. of Philadelphia, Pa. | I. |
| Amberlite IRA 401 | | I. |
| Amberlite IRA 402 | | I. |
| Amberlite IRA 410 | | II. |
| Amberlite IRA 411 | | II. |
| Permutit S-1 | The Permutit Co. of New York, New York. | I. |
| Permutit SK | | Pyridine. |

The resins utilized according to the present novel process are normally obtained as granules or uniform beads, usually in the hydroxide or chloride form and in particle sizes of from about 16 to 400 mesh. The chloride form is more commonly available; however, any form of the resin may be employed, so long as the anionic component is exchangeable by chloride and bromide ions. In addition to the chloride and hydroxide forms, the acetate, nitrate, bisulfate and sulfate, phosphate, fluoride, and the like forms may be used. Treating any of these resins with bromine in sodium chloride brine, for example, results in the anions of the resin being displaced by a bromine-containing polyhalide ion as has been discussed above. Mixtures of these resins may be used in practicing the present invention.

Normally, the strong base anion-exchange resins, as prepared by the known methods and obtained commercially, are in part reactive towards free bromine and chlorine, and at first irreversibly consume some of this halogen in undergoing substitution or addition reactions. To obtain consistent results, it may be necessary to condition the resin by pretreatment with bromine or chlorine, or both, in effect to "burn away" (or halogenate) labile (or reactive) sites and produce a resin providing consistently high yields of recoverable bromine by the adsorption and recovery processes. One method of conditioning the resin is to chlorinate it to constant weight (usually up to 10% weight increase) by maintaining the wet resin in contact with chlorine at ambient temperatures for 1 to 24 hours. Another method is to contact the resin, in chloride form, with bromine water or bromine chloride in water, saturating the resin with adsorbed halogen, then reducing the adsorbed halogen with $SO_2$ in water, and washing the resin with brine to elute the reduction products. The cycle is repeated until reproducible results are obtained in terms of bromine recoveries.

Representative examples illustrating the present invention follow:

*Example 1*

A column of a bromine-laden strong base anion exchange resin, specifically commercial Dowex 1X8 in the chloride form holding 0.13 gram adsorbed molecular bromine per gram of resin, is treated with a stream of chlorine gas (900 cc./minute) at room temperature, the off-gas being directed through a scrubber containing carbontetrachloride. Chlorine flow is continued until the orange color of the bromine-loaded resin is changed to yellow and chlorine is no longer adsorbed by the resin. The carbontetrachloride solution of the scrubber contains oxidant bromine removed from the off-gas.

The bromine laden resin for the above experiment was obtained by passing bromine water through a bed of water-wet resin chloride in the manner of Aveston et al., Chemistry and Industry, September 1957, page 1238.

*Example 2*

The procedure of Example 1 is repeated with a saturated sodium chloride brine that has been saturated with chlorine gas as the bromine stripping agent. In this case, the effluent from the column is collected directly; on analysis, it is found to contain oxidant bromine removed from the resin.

*Example 3*

A 10 ml. sample of Dowex 21–K, a quaternary ammonium type strong base anion exchange resin in the chloride form, was mixed with an excess of a pH 3 solution of sea water containing added $Br_2$ and $Cl_2$, the concentration of oxidant bromine corresponding to 5.5 mg. $Br_2$/ml. and that of oxidant chlorine corresponding to 4.45 mg. $Cl_2$/ml. of solution. At saturation the resin was uniformly colored reddish yellow (characteristic of adsorbed bromine chloride) and contained about 0.4 mg. of bromine/ml. of resin. To further increase the bromine loading, the resin was then mixed with a solution of 1.6 grams sodium bromide in 50 ml. sea water whereupon the resin picked up an additional 0.117 g. bromine/ml. and assumed a dark red bromine-like color. The bromine-laden resin was filtered from the residual aqueous phase, placed in a column and treated with a down-flowing room temperature slow stream (1 in./min.) of sea water saturated with chlorine gas. The effluent was collected, and after a total of 88 volumes had been recovered, was found to contain 0.81 g. of oxidant bromine or 69% of the 1.17 g. adsorbed by the reisn in the second step above.

Dowex 1X8 and Dowex 21–K, quaternary ammonium type strong base anion exchange resins, are more particularly described in "Dowex: : Ion Exchange," The Dow Chemical Co., 1958, pp. 4, 5 and 71.

Any of the heretofore described anion-exchange resins may be substituted in the preceding examples to give substantially the same results. Other practical variations and modifications may of course be made by one skilled in the art within the scope of this invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for recovering bromine that is adsorbed on an anion-exchange resin, which process comprises contacting the bromine-laden resin with chlorine to produce a bromine-containing effluent and recovering bromine from the effluent.

2. A process for recovering bromine that is adsorbed on an anion-exchange resin, which process comprises contacting the bromine-laden resin, at from ordinary atmospheric temperatures to about 100° C., with an excess of chlorine, said excess of chlorine corresponding to at least about 6 atoms of said chlorine for each atom of said adsorbed bromine, followed by recovering bromine from the resulting effluent.

3. The process of claim 2 wherein the chlorine to adsorbed bromine ratio is within the range of 25/1 to 100/1.

4. A process for recovering bromine values from bromide-containing brines, in which process said bromide is converted to bromine, said bromine then being adsorbed as polybromohalide anions on an anion-exchange resin, the resulting bromine-laden resin then being contacted with chlorine to produce an effluent, followed by recovering molecular bromine from the resulting effluent.

5. The process of claim 4 wherein said brine is acidified to a pH below 5 and oxidized with from about 0.5 to 1 mole of chlorine per bromide ion to convert the bromide content of said brine to bromine.

6. The process of claim 4 wherein the bromine-laden resin is contacted with an excess of chlorine corresponding to at least 6 atoms of chlorine for each atom of adsorbed bromine.

References Cited in the file of this patent

UNITED STATES PATENTS

| | | |
|---|---|---|
| 728,566 | Grove | May 19, 1903 |
| 1,844,563 | Curtin | Feb. 9, 1932 |
| 2,157,508 | Urbain et al. | May 9, 1939 |
| 2,359,221 | Kenaga | Sept. 26, 1944 |
| 2,388,586 | Williamson et al. | Nov. 6, 1945 |
| 2,945,746 | Shaw | July 19, 1960 |